Figure 1:
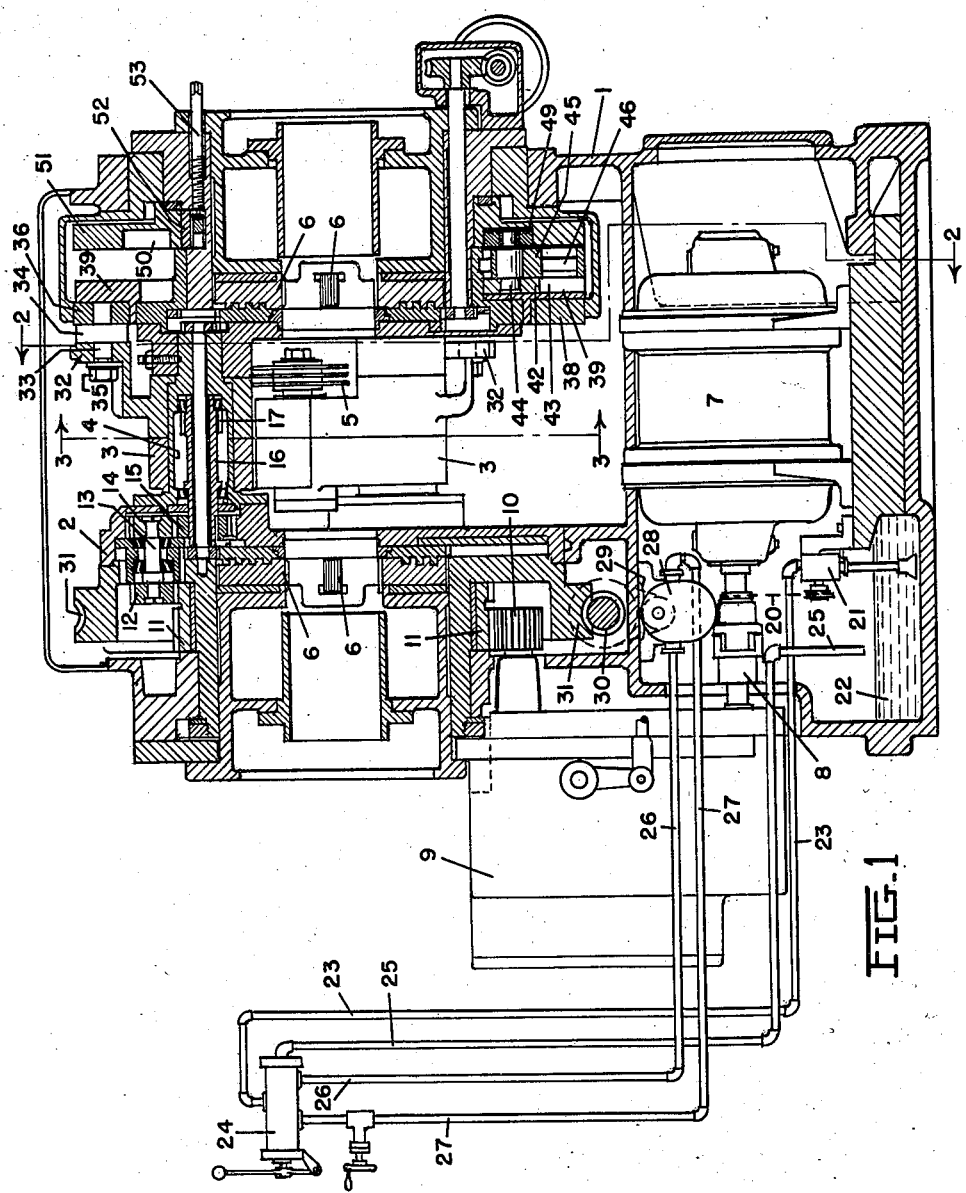

April 28, 1942.   E. R. MOTCH, JR., ET AL   2,281,450
ROTARY TOOL MACHINE
Filed Oct. 3, 1939    4 Sheets-Sheet 1

INVENTORS.
EDWIN R. MOTCH Jr. and
JOHAN GUSTAF MOOHL
BY
Oberlin, Limbach & Day
ATTORNEYS.

April 28, 1942.   E. R. MOTCH, JR., ET AL   2,281,450
ROTARY TOOL MACHINE
Filed Oct. 3, 1939   4 Sheets-Sheet 2

INVENTORS.
EDWIN R. MOTCH Jr. and
JOHAN GUSTAF MOOHL
BY Oberlin, Limbach & Day
ATTORNEYS April 28, 1942.   E. R. MOTCH, JR., ET AL   2,281,450
ROTARY TOOL MACHINE
Filed Oct. 3, 1939   4 Sheets-Sheet 3

INVENTOR.
EDWIN R. MOTCH Jr. and
JOHAN GUSTAF MOOHL
BY
Oberlin, Limbach & Day
ATTORNEYS April 28, 1942.    E. R. MOTCH, JR., ET AL    2,281,450
ROTARY TOOL MACHINE
Filed Oct. 3, 1939    4 Sheets-Sheet 4

INVENTORS.
EDWIN R. MOTCH Jr. and
JOHAN GUSTAF MOOHL
BY Oberlin, Limbach & Day
ATTORNEYS Patented Apr. 28, 1942

2,281,450

UNITED STATES PATENT OFFICE 2,281,450

ROTARY TOOL MACHINE

Edwin R. Motch, Jr., Cleveland, and Johan Gustaf Moohl, Cleveland Heights, Ohio, assignors to The Motch & Merryweather Machinery Co., Cleveland, Ohio, a corporation of Ohio Application October 3, 1939, Serial No. 297,732

11 Claims. (Cl. 29—70)

The present invention, relating, as indicated, to a rotary tool machine, has particular reference to a machine wherein a plurality of rotary tools, such as saws, milling cutters, grinding and abrasive wheels and the like are positioned circumferentially around the periphery of the workpiece and are adapted to be bodily moved, during rotation about their own individual axes, in both a centripetal and circumferential direction. The present invention comprises an improvement in the rotary tool machine disclosed and claimed in our prior U. S. Patent No. 2,103,486, granted December 28, 1937.

Briefly outlined, the machine constituting the subject-matter of our aforesaid U. S. patent, comprises a rotatable member or face-plate, which is adapted to rotate about the axis of the work-piece and forms the carriage upon which the rotary tools are mounted; together with a rotary tool "in-feeding" mechanism consisting of a cam plate, the latter being so arranged and connected to the rotary tools as to cause them to move both inwardly and outwardly with respect to the work-piece. Our present improvement upon this machine consists first, in the provision of a fluid-actuating motor for driving the rotary tool-carrying member or face-plate; and secondly, in an improved and more efficient construction in the means for feeding the rotary tools inwardly and outwardly with respect to the work-piece.

The general object and nature of our present invention is to incorporate into the rotary tool machine, tool traversing power means which will insure a smoother and more efficient operation, and will automatically compensate for unforeseen irregularities encountered in practical operation, such as lack of uniformity in the physical properties of the work-piece, e. g., those of hardness, toughness or grain structure.

As a rotary tool, such as a saw, milling cutter or grinding wheel operates upon a work-piece, such as a piece of steel, for example, and is fed into the work, it will be found, as a matter of practical experience, that such rate of feed is not constant but quite irregular. Thus, for example, where a rotary metal saw is operating upon a steel pipe or bar, and being forced against or into the work-piece, it will encounter a hard spot which will counteract the tool "in-feeding" force. The result will be that if such force is not properly controlled, further and efficient feed of the tool will be impaired and the tool itself or appurtenant parts of the machine, most likely, will be damaged.

We have found that a fluid-actuated power means, such as a fluid motor, is most ideally adapted to effect the proper control of the feeding or traversing power applied to the rotary tool. Thus, when resistance to the tool-feeding force is encountered, the fluid-actuated means possesses sufficient inherent resiliency or yieldability so that a sudden shock or impact is not transmitted throughout the parts of the machine, and simultaneously, sufficient additional force is gradually built up by such a power means so that the resistance is overcome and the feeding of the tool continued.

To the accomplishment of the foregoing and related ends, said invention then consists of the means hereinafter fully described and particularly pointed out in the claims. The annexed drawings and the following description set forth in detail certain mechanism embodying the invention, such disclosed means constituting, however, but one of various mechanical forms in which the principle of the invention may be used.

In said annexed drawings—

Figure 2:
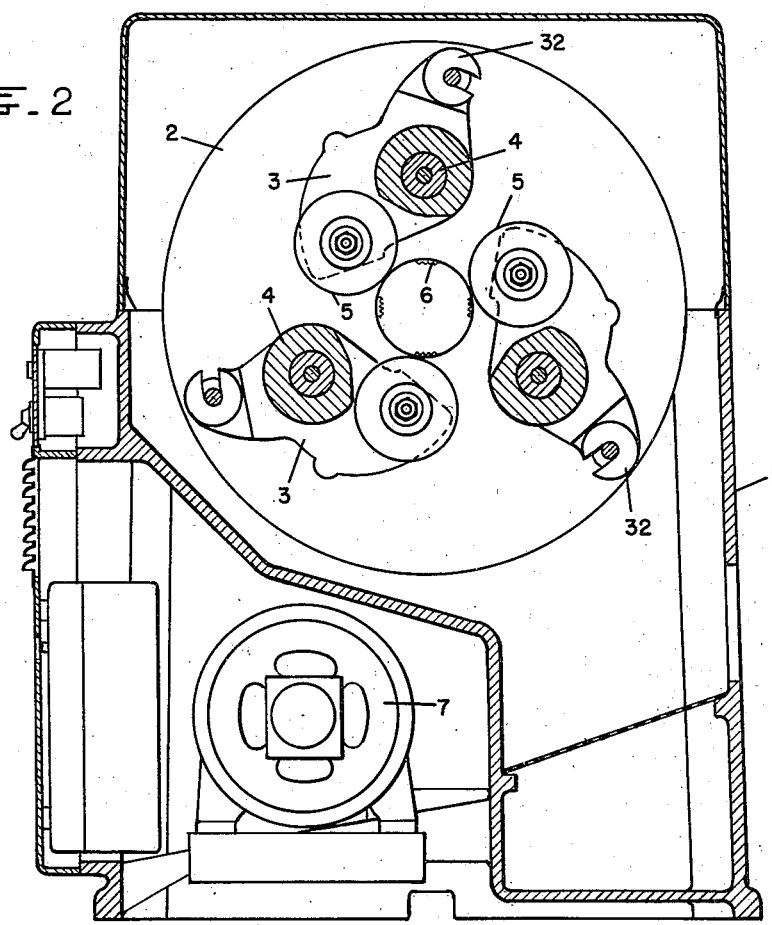
Figure 5:
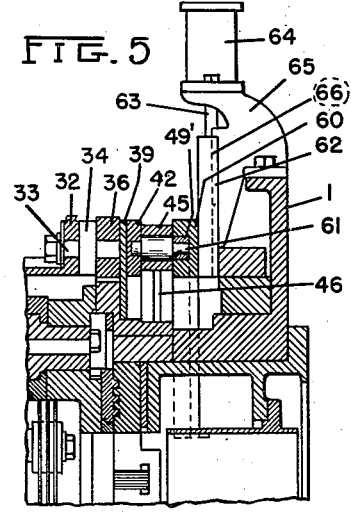
Figure 6:
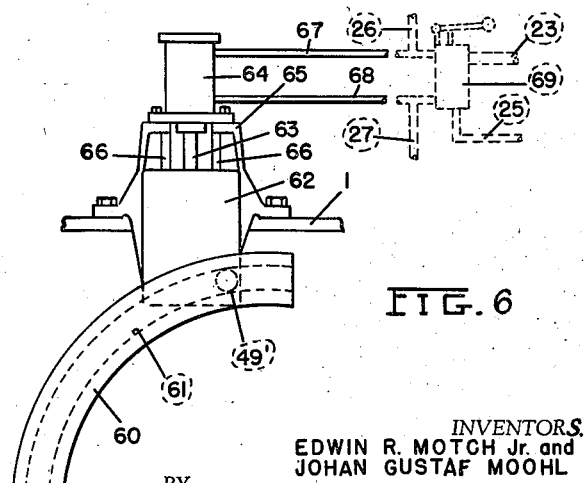
Figure 3:
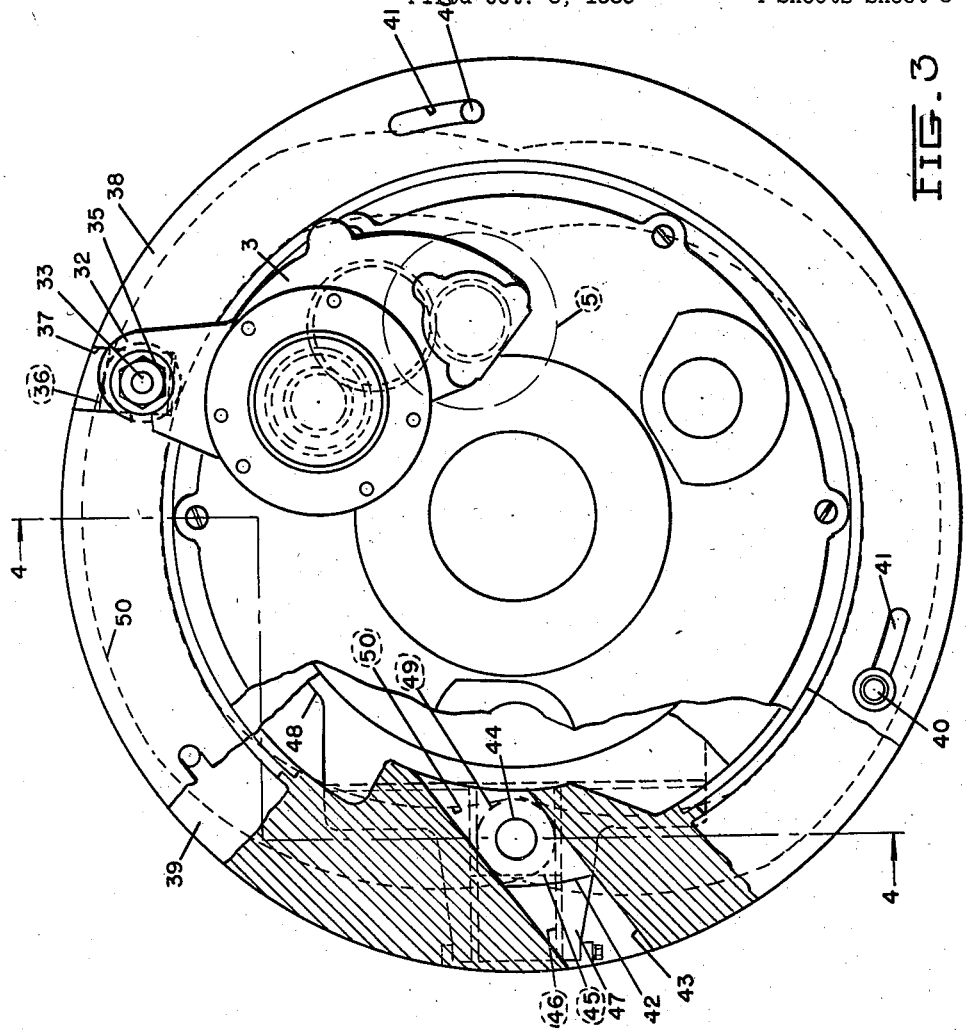
Figure 4:
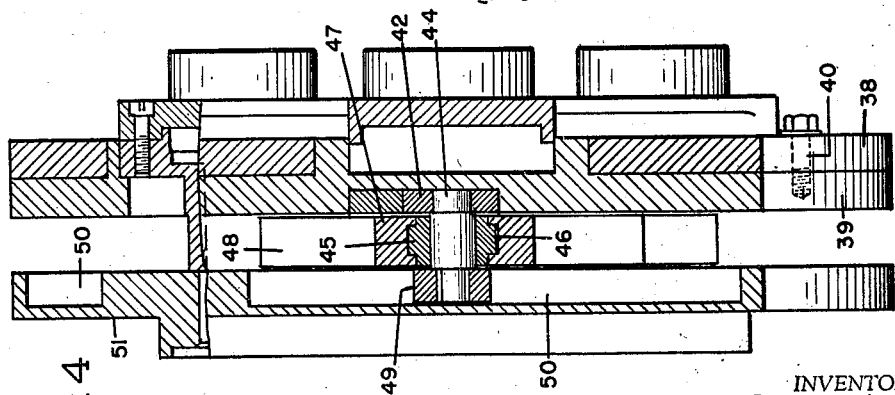
Figure 7:
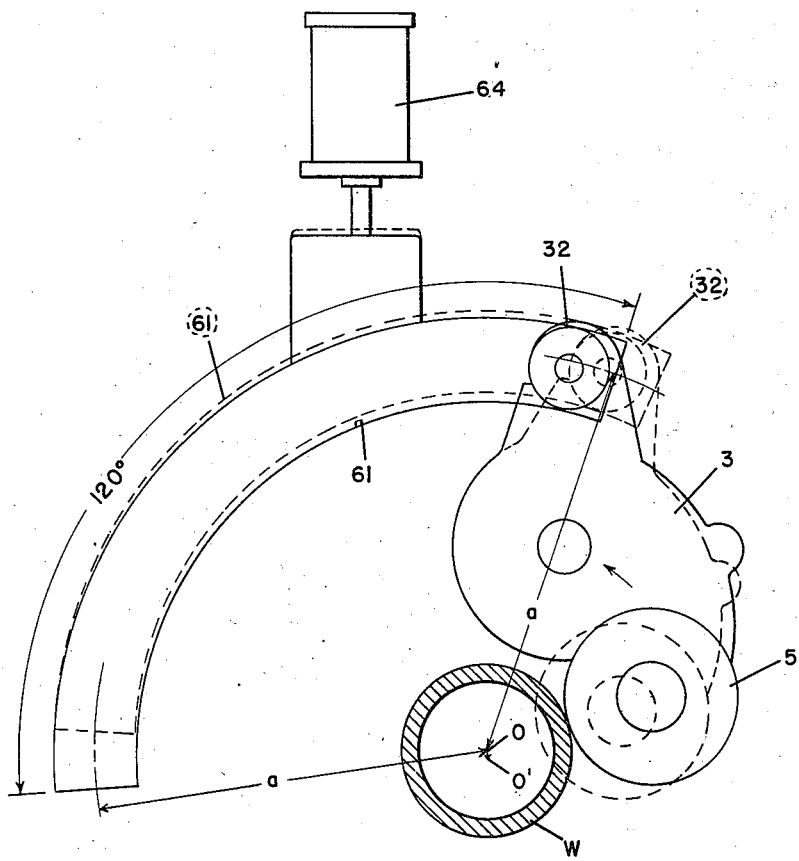
Figure 8:
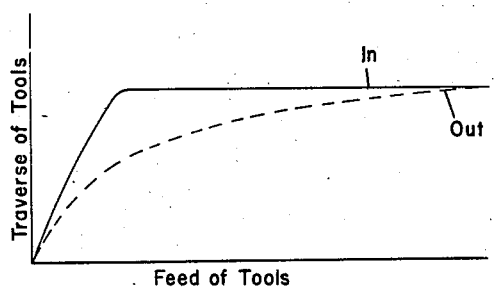

Fig. 1 is a vertical sectional view of a machine embodying the principle of our invention; Fig. 2 is a sectional view taken upon a plane normal to that of Fig. 1 and substantially along line 2—2 thereof; Fig. 3 is an elevational view, with portions broken away and in section, of the machine shown in Fig. 1 and taken upon a plane indicated by the line 3—3 thereof and in the direction of the arrows; Fig. 4 is a sectional view, taken substantially along line 4—4 of Fig. 3; Fig. 5 is a sectional view similar to the upper portion of that of Fig. 4 and showing an alternative form of construction wherein a hydraulic power means has been substituted for the mechanically driven cam plate of Figs. 1 to 4, inc.; Fig. 6 is an elevational detail of the hydraulic power means and attached cam track section of the alternative construction of Fig. 5; Fig. 7 is a more or less diagrammatic view illustrating the principle of operation of the alternative form of construction of Figs. 5 and 6; and Fig. 8 is a coordinate diagram plotting the rate of "in and out" feed of the rotary tools with respect to the circumferential traverse thereof in the operation of the alternative form of construction of Figs. 5 to 7, inc.

Now referring more particularly to Figs. 1 and 2 of the drawings, the machine shown therein comprises the base frame 1 upon which there is rotatably mounted the face-plate 2, the latter having a plurality of tool-supporting arms 3, pivotally mounted upon the outwardly projecting shafts 4. Rotary tools 5, such as saws, milling cutters, grinding wheels and the like, are carried on the inner ends of the supporting arms 3. In the present instance, three supporting arms 3 are shown with three rotary tools 5 mounted on the end of each arm.

Work-piece gripping chucks 6 are mounted in the frame 1 at both sides of the rotary tools 5. The chucks 6 are operated by scroll plates and connected mechanism which is described in detail in our aforesaid U. S. Patent No. 2,103,486, claimed therein and therefore, not further here described or claimed as a part of the present invention.

An electric driving motor 7 is mounted in the lower part of the base frame 1 and connected through the coupling 8 to change gears in the housing 9, and thence, through the drive pinion 10 to the large external sun gear 11. Planetary gears 12 mounted upon the shaft 13 drive through the gears 14 and 15, the shaft 16, and the latter is connected through the gear 17 and other intermediate gears not shown, to the rotary tools 5. By the last described power transmission means and gear train, the rotary tools 5 are thus caused to rotate about their own individual axes.

A chain and sprocket drive 20 connects the drive motor 7 to the oil pressure pump 21 connected to the oil reservoir 22. The outlet pipe 23 from the oil pump 21 connects to the control valve 24. A return or discharge pipe 25 leads from the control valve 24 back to the oil reservoir 22. Pipes 26 and 27 lead from the control valve 24 to the fluid motor 28 and a chain and sprocket drive 29 connects the fluid motor 28 to the worm 30 which engages with the worm wheel 21 carried by the face-plate 2. In this manner, the face-plate 2 is caused to rotate about its own axis by means of a fluid pressure power driving means.

Now directing attention particularly to Figs. 1, 3 and 4, the outer ends 32 of the rotary tool-supporting arms 3 are connected by means of the pins 33 having an integral collar 34 and a fastening nut 35 to the guide blocks 36. The guide blocks 36 are mounted in slots 37 in the ring 38. The ring 38 is mounted adjacent the intermediate ring 39 and has a lost motion rotative connection therewith through the pins 40, passing through the elongated arcuate slots 41. A guide block 42 is adapted to slide in the radially inclined slot 43 in the ring 39 and carry one end of the roller shaft 44. The intermediate enlarged portion of the roller shaft 44 carries the guide block 45 adapted to slide in the ways 46 of the radially extending arm 47 of a third ring 48. A roller 49 is carried on the other end of the roller shaft 44 and adapted to engage in the cam groove 50 of the cam plate 51. The cam plate 51 is held in a normally fixed position with respect to the base frame 1 but may be manually adjusted to the desired rotative position thereon by means of the internal gear segment 52 engaging with the threaded lock pinion on the end of the shaft 53.

In the last described portion of the machine, as the roller 49 is carried around the cam track 50 by reason of the rotation of the rotatable member 2 about its axis, it will be seen that the roller 49 will have a centrally in and out movement with respect to the axis of rotation. This in and out movement of the roller 49 is transmitted through the guide block 45, the ring 48, the guide block 42 and the slot 43, to advance and retard the rotation of the ring 39 with respect to the ring 38 connected to the outer ends 32 of the tool-supporting arms 3. The net result is that the tool-supporting arms 3 will be pivoted about their supporting shafts 4 so that the rotary tools 5 will be moved in and out with respect to the axis of rotation of the rotatable member and, of course, with respect to the center of the work-piece. Thus, as the roller 49 travels from its position, as shown in Fig. 3, through an arcuate distance of 180° to the corresponding "low spot" of the cam track 50, the rotary tools 5 will have performed a complete in and out-feed cycle. Since there are three of the rotary tools, as shown in the present embodiment of the machine, this cycle will, of course, be sufficient to more than completely traverse the cut of one rotary tool into the cutting or machining path of the next preceding tool, the tools, of course, being equally arcuately spaced and 120° of arcuate distance being theoretically sufficient travel per tool.

It will also be noted that as the roller 49 moves inwardly or towards the axis of rotation, that the plate 39 has moved in a counter-clockwise direction (with respect to Fig. 3) carrying the outer ends 32 of the tool-supporting arms 3 in a similar direction, and moving the rotary tools 5 outwardly or in a direction opposite to that of the movement of the roller 49 with respect to the axis of rotation of the rotatable member 2. Thus, the radial distance of the roller 49 from the axis of rotation is inversely proportionate to the in-feed of the rotary tools 5 with respect to the work-piece.

In the alternative form of construction shown in Figs. 5 and 6 and diagrammatically illustrated in Figs. 7 and 8, a cam track having a fixed and uniform curvature replaces the irregularly contoured cam track 50 previously described. Variation in the radial distance of the cam track from the axis of rotation of the rotatable member 2 is obtained by moving the cam track itself with respect to such axis. Furthermore, the cam track is made only of such arcuate length as is required for in-feed of the rotary tools, the out-feed being obtained by the reversal of the direction of rotation of the rotatable member 2. The alternative form of construction of Figs. 5 to 8 inclusive is particularly adapted to pipe cut-off work, where a single in-feed stroke and a single circumferential traverse of the rotary tools is sufficient.

Referring to Figs. 5 and 6, it will be seen that a segmental member 60 having a truly arcuate cam track 61 is substituted for and replaces the cam plate 51 of Figs. 1, 3 and 4. A cam roller 49' engages in the cam track 61 and is connected through the guide blocks 45 and 42, the ring 39, the guide blocks 36 and the pins 33 to the outer ends 32 of the rotary tool supports 3. The cam member 60 is carried upon a mounting plate 62 which, in turn, is connected by means of the piston rod 63 to the piston (not shown) in the hydraulic cylinder 64. The hydraulic cylinder 64 is mounted upon a supporting frame 65 which, in turn, is fixed to the base frame 1 of the machine. The cam member supporting plate 62 travels in ways 66 in the frame 65.

Pressure pipes 67 and 68 are connected to the hydraulic cylinder 64, either directly to the pressure lines 26 and 27 leading to the fluid motor 28, so that the hydraulic cylinder 64 will be operated in unison with the motor 28; or the pipes 67 and 68 can be connected to a separate control valve 69 which, in turn, is connected to the pressure line 23 and return line 25.

The operation of the last described alternative form of construction is diagrammatically illustrated by reference to Fig. 7, where the cam track 61 is represented as being directly engaged by a roller on the outer end 32 of the rotary tool-supporting arm 3. The radius of curvature (a) of the cam track 61, is constant so that the contour of the cam track corresponds to the arc of a true circle. And the center of this circle coincides with the center of axis of rotation of the rotatable member 2 and of the work-piece W, when the cam track 61 is in the position as shown in dotted lines in Fig. 7, or when the piston in the hydraulic cylinder 64 is in retracted position. When the piston in the hydraulic cylinder 64 is in extended position, the cam track 61 is moved into the position shown in full lines in Fig. 7 so that its true center is displaced downwardly from the center or axis O of the rotatable member 2 to the new center O'. Thus, in operation, the cam track 61 is initially in the position shown in full lines and moved outwardly to the position shown in dotted lines, whereupon, the outer end 32 of the tool support 3 (connected to the remaining tool supports) is moved outwardly with corresponding inward movement or in-feed of the rotary tools 5. The arcuate length of the cam track 61 is approximately 120°, or a sufficient arcuate distance to accommodate the circumferential traverse of three equally spaced tool-supporting arms 3. Where a series of three rotary tools is used, and as the rotatable member travels around in a counter-clockwise direction, as shown by the arrow in Fig. 7, the outer ends 32 of the tool supports 3 are maintained at a "full out" position, or at full depth cut during the circumferential traverse of the tools around the work-piece W. At this point, the rotation of the rotatable member is stopped, the cam track 61 moved from the position in dotted lines to the position shown in full lines, whereupon, as the rotatable member is reversed, or turned in a clockwise direction with respect to Fig. 7, and rotated back to its original position, the tool supports 3 are correspondingly moved and the rotary tools 5 moved out from the work-piece W.

Fig. 8 is a coordinate diagram illustrating the rate of feed of the rotary tools 5 with respect to the work-piece and in relation to their circumferential traverse about the latter. Thus, as pressure is introduced into the hydraulic cylinder 64 at the beginning of the in-feed, it will be seen that there will be a relatively rapid in-feed of the rotary tools during the first portion of the circumferential traverse of the latter, and that as soon as such full depth in-feed is obtained, it will remain constant. This feeding action of the rotary tools 5 is particularly desirable in pipe cut-off work, since the tools are initially and rapidly fed to full depth of cutting and then moved around the work-piece W a sufficient circumferential distance to meet and slightly overlap the beginning of the cut of the next preceding tool. This mode of operation, for one thing, permits a more rapid cutting off action, since it is not necessary to circumferentially traverse the tools 5, or to rotate the rotatable member 2 any greater distance than absolutely necessary for the full depth cutting path of one tool to meet with the full depth cutting path of the next one. In other words, where the in-feed of the rotary tools to full depth is not obtained until the tools have undergone a substantial portion of their circumferential traverse, it is obvious that additional traverse of all of the tools is necessary in order to make a complete cut around and through the wall of the pipe.

The rate of out-feed of the rotary tools 5 is also diagrammatically illustrated by the dotted line in Fig. 8. Thus, as the cam track 61 is moved from dotted to full line position, when the rotatable member is stopped and ready to be oppositely rotated in a clockwise direction, there will be a slight immediate out-feed movement of the tools, which movement is, of course, not as great as that of the initial in-feed movement. The out-feed movement, then continues gradually and progressively during the return traverse of the tools until it reaches the "full out" position.

It will thus be seen that by virtue of the above described invention, that the control of the circumferential traverse and in-feed of the rotary tools is such as to produce an efficient and flexible operation of the machine as a whole, and without subjecting the latter or any of its parts to possible destructive impact or shock. Thus, as the rotary tools 5 are circumferentially traversed about the work, by reason of the rotation of the rotatable member 2 through the power transmitted from the fluid member 28, and when a "hard spot" or a greater thickness of material in the work-piece, or any other condition arises tending to cause irregularity in the cutting action, the force applied to produce such traverse and feed of the tools will be momentarily overcome, and it will be overcome with a "cushioning" action, due to the inherent resiliency or yieldability in the fluid pressure driving means. And as further traverse in-feed of the cutting tools remains static, due to resistance encountered or other causes, the force applied by the fluid pressure driving means will automatically build up and increase until such resistance is overcome. The present invention, therefore, is productive of not only improving the efficiency of operation of the machine, but also adds to its durability and life of usage.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a rotary tool machine, the combination of a rotatable member carrying a plurality of rotary tools, cam means for moving said tools inwardly and away from a common center on rotation of said rotatable member, a worm wheel carried by said rotatable member, a worm meshing with said worm wheel and a fluid power motor for driving said worm member.

2. In a rotary tool machine, the combination of means for mounting a plurality of rotary tools around a common center with movement bodily of said tools toward, away from, and around a common center, a movable cam track bodily movable throughout its length in a direction eccentric of said common center, means connecting said mounting means to said cam track, and power means for moving said cam track.

3. In a rotary tool machine, the combination of means for mounting a plurality of rotary tools around a common center with movement bodily of said tools toward, away from, and around a common center, a movable cam track movable in a direction eccentric of said common center, means connecting said mounting means to said cam track, and fluid pressure actuated means for moving said cam track.

4. In a rotary tool machine, the combination of a rotatable member, a plurality of rotary tool supports carried by said rotatable member, said tool supports being movable inwardly and away from the axis of said rotatable member, a movable cam track connected to said supports, and means for movably supporting said cam track comprising a fluid pressure actuated cylinder and piston.

5. In a rotary tool machine, the combination of a rotatable member, a plurality of rotary tool supporting arms pivotally mounted on and equally arcuately spaced on said rotatable member, means for interconnecting the pivotal movement of said arms, a cam track having a length at least equal to the arcuate distance between two of said arms, said cam track having a contour corresponding to an arc of a true circle and being bodily movable in a direction eccentric of said rotatable member, and means connecting said arms to said track.

6. In a rotary tool machine, the combination of a rotatable member, a plurality of rotary tool supporting arms pivotally mounted on and equally arcuately spaced on said rotatable member, means for interconnecting the pivotal movement of said arms, a cam track extending around a portion of the periphery of said rotatable member and adapted to be engaged by one of said arms, said cam track having a contour corresponding to the arc of a true circle, and means for bodily moving said track in a direction diametrically parallel to the center of said rotatable member.

7. In a rotary tool machine, the combination of a rotatable member, a plurality of rotary tool supporting arms pivotally mounted on and equally arcuately spaced on said rotatable member, means for interconnecting the pivotal movement of said arms, a cam track extending around a portion of the periphery of said rotatable member and adapted to be engaged by one of said arms, said cam track having a contour corresponding to the arc of a true circle scribed by a point on one of said arms when the latter is held against pivotal movement and at a position corresponding to infeed depth of said tools with respect to the work, and means for moving said cam track bodily inwardly toward the center of said rotatable member, and in a path diametrically parallel thereto.

8. In a rotary tool machine, the combination of a rotatable member, a plurality of rotary tool supporting arms pivotally mounted on and equally arcuately spaced on said rotatable member, means for interconnecting the pivotal movement of said arms, a cam track extending around a portion of the periphery of said rotatable member and adapted to be engaged by one of said arms, said cam track having a contour corresponding to the arc of a true circle, and yieldable power means for moving said cam track in a direction diametrically parallel to the center of said rotatable member.

9. In a rotary tool machine, the combination of a rotatable member, a plurality of rotary tool supporting arms pivotally mounted on and equally arcuately spaced on said rotatable member, means for interconnecting the pivotal movement of said arms, a cam track extending around a portion of the periphery of said rotatable member and adapted to be engaged by one of said arms, said cam track having a contour corresponding to the arc of a true circle, and a hydraulic cylinder and piston supporting said cam track and being so constructed and arranged as to move said cam track bodily in a direction diametrically parallel to the center of said rotatable member.

10. In a rotary tool machine, the combination of a rotatable member, a plurality of rotary tool supporting arms pivotally mounted on and equally arcuately spaced on said rotatable member, means for interconnecting the pivotal movement of said arms, a cam track extending around a portion of the periphery of said rotatable member and adapted to be engaged by one of said arms, said cam track having a contour corresponding to the arc of a true circle scribed by a point on one of said arms when the latter is held against pivotal movement and at a position corresponding to infeed depth of said tools with respect to the work, and yieldable power means for moving said cam track in a direction diametrically parallel to the center of said rotatable member.

11. In a rotary tool machine, the combination of a rotatable member, a plurality of rotary tool supporting arms pivotally mounted on and equally arcuately spaced on said rotatable member, means for interconnecting the pivotal movement of said arms, a cam track extending around a portion of the periphery of said rotatable member and adapted to be engaged by one of said arms, said cam track having a contour corresponding to the arc of a true circle scribed by a point on one of said arms when the latter is held against pivotal movement and at a position corresponding to infeed depth of said tools with respect to the work, and a hydraulic cylinder and piston supporting said cam track and being so constructed and arranged as to move said cam track bodily in a direction diametrically parallel to the center of said rotatable member.

EDWIN R. MOTCH, JR.
JOHAN GUSTAF MOOHL.